United States Patent
Patzold et al.

(10) Patent No.: US 9,046,181 B2
(45) Date of Patent: Jun. 2, 2015

(54) NON-RETURN VALVE AND HYDRAULIC VALVE WITH A FITTED NON-RETURN VALVE

(75) Inventors: Holger Patzold, Burgebrach (DE); Philipp Bittel, Bamberg (DE); Barbara Pluta, Eggolsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 20 days.

(21) Appl. No.: 13/811,784

(22) PCT Filed: May 23, 2011

(86) PCT No.: PCT/EP2011/058350
§ 371 (c)(1),
(2), (4) Date: Jan. 23, 2013

(87) PCT Pub. No.: WO2012/013386
PCT Pub. Date: Feb. 2, 2012

(65) Prior Publication Data
US 2013/0118622 A1 May 16, 2013

(30) Foreign Application Priority Data
Jul. 26, 2010 (DE) .......... 10 2010 032 251

(51) Int. Cl.
*F16K 15/16* (2006.01)
*F16K 15/14* (2006.01)
*F01L 1/344* (2006.01)

(52) U.S. Cl.
CPC ............ *F16K 15/14* (2013.01); *F01L 1/3442* (2013.01); *F01L 2001/34426* (2013.01); *F01L 2001/3443* (2013.01); *F01L 2001/34433* (2013.01); *F16K 15/144* (2013.01); *F16K 15/16* (2013.01)

(58) Field of Classification Search
CPC ....... F16K 15/144; F16K 15/16; F16K 15/14; B65D 77/225
USPC .................. 137/855, 852, 454.2, 527.4, 859; 123/90.31
See application file for complete search history.

(56) References Cited

U.S. PATENT DOCUMENTS

| | | | |
|---|---|---|---|
| 1,783,599 A * | 12/1930 | Blake | 267/223 |
| 2,369,170 A | 2/1945 | Motsinger | |
| 2,598,216 A * | 5/1952 | Bousky | 137/856 |
| 3,292,658 A | 12/1966 | Scaramucci | |
| 6,240,962 B1 | 6/2001 | Tai et al. | |
| 7,389,756 B2 * | 6/2008 | Hoppe et al. | 123/90.17 |
| 2005/0252561 A1 * | 11/2005 | Strauss et al. | 137/625.68 |
| 2006/0000459 A1 * | 1/2006 | Freeman et al. | 123/574 |

FOREIGN PATENT DOCUMENTS

| | | |
|---|---|---|
| DE | 4445650 | 6/1996 |
| DE | 19834140 | 8/1999 |
| DE | 102008004591 | 7/2009 |
| DE | 10321633 | 1/2013 |

* cited by examiner

*Primary Examiner* — Kevin Lee
*Assistant Examiner* — P. Macade Nichols
(74) *Attorney, Agent, or Firm* — Volpe and Koenig, P.C.

(57) ABSTRACT

A non-return valve (8) having a sealing seat (2) having an opening (16) and also a resilient, flat closing element (10), which covers the opening (16) in a closed position. In view of simple assembly of the non-return valve (8), the closing element (10) and the sealing seat (12) are connected fixedly to one another and form a prefabricated structural unit (13).

8 Claims, 2 Drawing Sheets

NON-RETURN VALVE AND HYDRAULIC VALVE WITH A FITTED NON-RETURN VALVE

FIELD OF THE INVENTION

The invention relates to a non-return valve and a hydraulic valve, in particular, a control valve for controlling flows of pressurized medium in a camshaft adjuster, with a fitted non-return valve.

In modern internal combustion engines, devices for variably setting the timing of gas exchange valves, also known as camshaft adjusters, are used to be able to variably form the phase position of a camshaft relative to a crankshaft in a defined range of angles between a maximum advanced position and a maximum retarded position. The cams of the camshafts commonly contact cam followers, for example, bucket tappets, rocker arms, or finger levers. If a camshaft is set in rotation, the cams roll on the cam followers that, in turn, actuate the gas exchange valves. The position and the shape of the cams thus define both the opening period and also the opening magnitude, but also the opening and closing times of the gas exchange valves.

The angular displacement of the camshaft with respect to the crankshaft for achieving optimized timing for different rotational speeds and load states is called camshaft adjustment. One structural variant of a camshaft adjuster operates, for example, according to the so-called oscillating engine principle. Here, a stator and a rotor are provided that lie coaxially and can move relative to each other. The stator and the rotor together form pairs of hydraulic chambers. Each chamber pair is hereby bounded by webs of the stator and divided by each vane of the rotor into two pressure chambers that act against each other and whose volumes are changed in opposite directions by a relative rotational movement of the rotor relative to the stator. In the maximum adjustment position, each vane contacts one of the edge-side webs of the stator. The relative rotational movement of the rotor is realized by an adjustment of the vane in that a hydraulic medium or pressurized medium, such as oil, is introduced by means of pressurized medium channels into one of the pressure chambers of the chamber pair and presses away the vane. The pressurized medium channels open on both sides of each vane, so that the hydraulic medium is guided into the respective pressure chamber.

For controlling flows of pressurized medium for camshaft adjusters, hydraulic control valves in the form of multiple-path gate valves are normally used. As essential components, they comprise a valve housing and a control piston that is held so that it can move in the axial direction in a housing cavity and is activated by an actuator, typically an electromagnet with a tappet.

In one common construction, such control valves are controlled as so-called central valves that are used in a central hole of the rotor of a camshaft adjuster. The valve housing of such a central valve is provided with a thread by means of which the valve housing can be screwed into a corresponding threaded hole of the camshaft, in order to connect the rotor to the camshaft in a rotationally locked way. A feed of pressurized medium to the pressurized medium connection and a discharge of pressurized medium from the discharge connection of the control valve are performed through the rotor and the camshaft, respectively. The feed of pressurized medium is performed in the radial direction by means of a feed connection. By means of two work connections on the valve housing, the pressurized medium is introduced alternately into the opposing chambers of a chamber pair. Depending on the position of the control piston, one of the chambers is connected to the feed connection by means of one of the work connections and is filled with the pressurized medium. At the same time, the opposing chamber communicates with a discharge connection on the control valve by means of the work connection allocated to it and is emptied in this way.

When the internal combustion engine is operating, the camshaft can be subjected to changing moments that are transferred via the pressure chambers as pressure shocks to the hydraulic system of the camshaft adjuster. To prevent a transmission of such pressure shocks, non-return valves that can be unlocked hydraulically are used in the pressurized medium feed of the camshaft adjuster.

A control valve with an integrated, flat non-return valve is described in DE 10 2008 004591. A hollow pressurized medium insert that has an outer diameter adapted to the inner diameter of the housing is inserted in a valve housing of the control valve. The pressurized medium insert comprises a sleeve-shaped insert section with a structural section that is shaped on the housing side and is provided on the end with an axial support ring. The support ring is held within an axial holding collar that is shaped on a seating surface body. The holding collar is bent radially inward on its free end and engages behind the support ring, wherein the three components of the seating surface body, closing element, and pressurized medium insert are fixed in their relative axial position. An end surface of the axial support ring comes into contact with a closing element that contacts, on its side, against a seating surface shaped by the seating surface body. The plate-shaped closing element has a plurality of openings that are constructed such that a central closing part spring-mounted by means of multiple spring tabs is shaped for closing a valve opening. The openings here surround the closing part in a spiral shape.

Such a multiple-part construction of a non-return valve leads to increased handling costs and is associated with multiple processing steps in the installation of the individual components. Especially for the case of small parts that are used, e.g., in a flat, disk-shaped non-return valve, the handling and the installation steps are critical to the quality and time-intensive.

SUMMARY

The invention is based on the objective of allowing a non-return valve with a small configuration to be easily installed at its position of use.

This objective is solved according to the invention by a non-return valve comprising a seal seat with an opening and a spring-like, flat closing element that covers the opening in a closed position, wherein the closing element and the seal seat are connected rigidly to each other and form a prefabricated structural unit.

The invention is based on the idea that a simple installation of a two-part or multiple-part non-return valve is guaranteed by assembling the individual parts of the non-return valve, which are made, in particular, from different materials, into one prefabricated and, in particular, non-detachable structural unit before the use of the non-return valve. The result is the completion of a complete non-return valve that is also ready for use without expansion by other components. The non-return valve is produced as a simple structural unit and as such is supported, transported, and installed at its position of use. This provides simplified and convenient handling, so that the complexity of the installation is minimized. In particular, if the non-return valve has small components and/or a precise assembly of the components is required, the construction of the non-return valve as a prefabricated structural unit is very advantageous.

The flat closing element that has, in particular, a plate-like or disk-like shape, forms a spring element due to its geometry and its material composition. The spring element is supported against the seal seat, wherein the spring element is connected to the seal seat at one or more points so that it is fixed in position. If no external forces act on the non-return valve, it is in the closed position in which the closing element lies on the seal seat and here covers and closes the opening. Through the pressing force of a pressurized medium that acts on the closing element from a certain direction, a free, non-fixed area of the closing element is lifted from the seal seat. The non-return valve is here located in an open position in which the opening in the seal seat is opened and the pressurized medium flows through the opening. When the pressurized medium changes in direction, this presses the closing element against the seal seat again, which closes the opening and prevents a return flow of the pressurized medium. Due to the spring-like properties of the closing element, the non-return valve is automatically closed, even when external forces no longer act on the closing element.

According to one preferred construction, the closing element comprises at least one bending web on which, at the ends, a closing plate for the opening and a fixing end for attaching the closing element on the seal seat are arranged. Through this special construction of the closing element, the spring-like properties are imparted to it, so that it acts as a spring element. The closing element is fixed, on the end on the bending web, so that it is fixed in position on the seal seat in the area of the fixing end, so that the closing plate on the other end of the bending web can realize a pivoting movement between the closed position in which it covers the opening in a fluid-tight way and the open position in which the opening is opened. The bending web here acts as a lever that supports the pivoting movement of the closing plate for a comparatively low pressing force of the pressurized medium.

According to another preferred construction, the fixing end has at least one, in particular, two fixing arms that are connected rigidly to the seal seat over their entire length or only partially, i.e., in the area of their ends. If there are two fixing arms, the shape of the fixing arms is adapted to the cylindrical shape of the valve housing or to the outer contours of the disk-shaped seal seat, so that the two fixing arms form a circular arc. Alternatively, the fixing end also has multiple fixing arms. By increasing the fixing end according to two or more fixing arms, an especially secure connection is guaranteed between the closing element and the seal seat by means of an increased area.

Preferably, the closing element is made from spring steel. Alternatively, other spring materials, such as copper alloys, nickel alloys, cobalt alloys, or plastic, are also suitable for the construction of the closing element. In particular, the closing element here has a thickness in the range 0.1 to 0.5 mm or even stronger depending on the functional requirements. Spring steel is flexible and has sufficient hardness. Due to these properties, spring steel is suitable for use as the closing element in a non-return valve.

With regard to an especially simple production of the seal seat, this is preferably a die cast part, in particular, made from plastic. A secure and easy-to-produce connection between the closing element and the seal seat is given if the fixing end of the closing element is advantageously injection molded with the material of the seal seat. In addition, in this way the spring-like function of the closing element is made possible, because only the fixing end, i.e., only the fixing arms of the closing element are completely or partially injection molded with the material of the seal seat in a one-step or multiple-step casting process. In a one-step casting process, in only one work process the closing element is placed and the seal seat injection molded, wherein the fixing arms are completely injection molded or alternatively only at their ends with the material of the seal. In a multiple-step casting process, first the seal seat is molded and then the closing element is set in place and is finally molded completely or partially in the area of its fixing end. After the fixing of the closing element on the seal seat, the bending web and the closing plate can perform a pivoting movement. Through the partial molding of the closing element with the material of the seal seat, the spring-like and non-spring-like components of the non-return valve that are made from different materials are connected to each other in a non-detachable way.

The objective is further solved according to the invention by a hydraulic valve, in particular, a control valve for controlling flows of pressurized medium in a camshaft adjuster, comprising a hollow valve housing with at least one feed connection and at least one discharge connection, wherein a non-return valve according to one of the preceding constructions is installed in the valve housing.

The advantages listed with regard to the non-return valve and preferred embodiments can be transferred analogously to the hydraulic valve.

BRIEF DESCRIPTION OF THE DRAWINGS

One embodiment of the invention is explained in more detail with reference to a drawing. Shown herein are.

The same reference numbers have the same meaning in the figures.

DETAILED DESCRIPTION OF THE PREFERRED EMBODIMENTS

Figure 1:
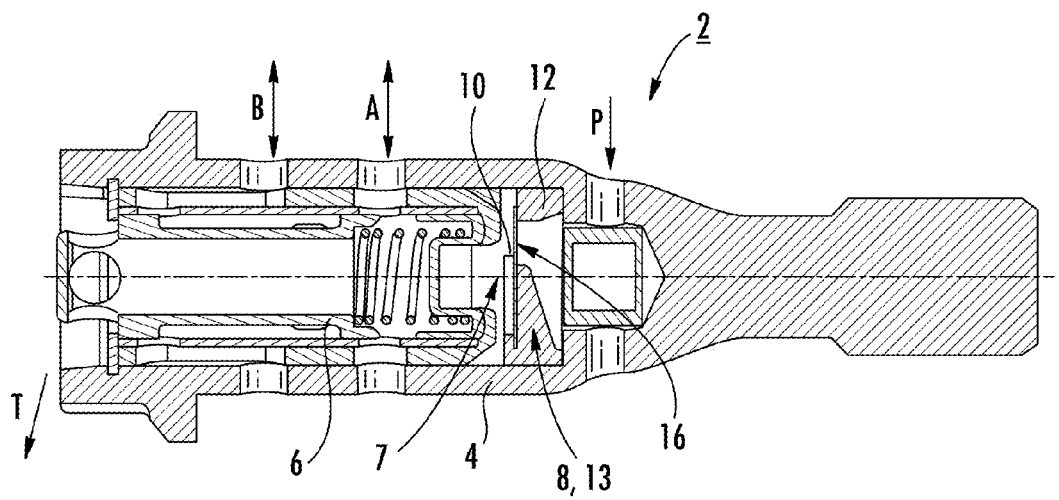
FIG. 1 an axial section view through a control valve.
Figure 2:
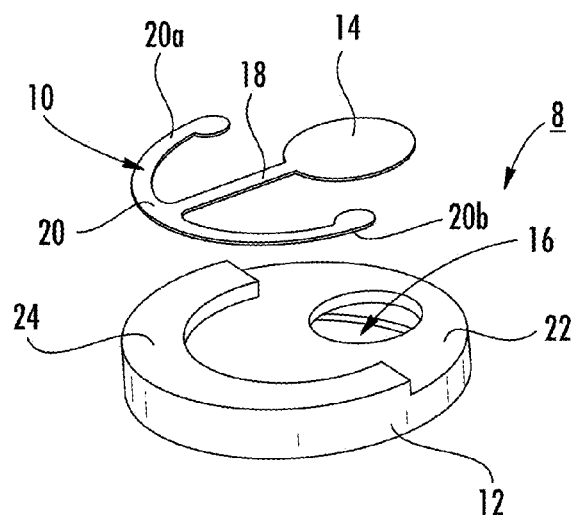
FIG. 2 in an exploded view, the components of a non-return valve.

In FIG. 1, a control valve 2 is shown that is constructed as a central valve and is used in a central hole of a rotor of a hydraulic camshaft adjuster that is not shown in more detail here. The control valve 2 comprises a hollow cylindrical valve housing 4 with a feed connection P, two work connections A, B for the pressurized medium chambers acting in opposite directions in the rotor of the camshaft adjuster, and a discharge connection T. Within the valve housing 4, a control piston 6 is guided in the axial direction, wherein, depending on its position, the supply connection P is connected to one of the work connections A, B in terms of flow, while the other work connection A, B is connected to the discharge connection T. In the area of a pressurized medium line 7 between the feed connection P and the work connections A, B there is a non-return valve 8 that can be unlocked hydraulically and opens a pressurized medium line 7 in the feed direction.

Figure 3:
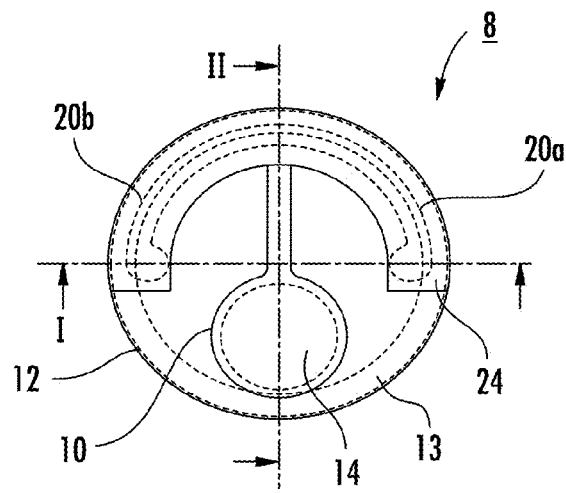
FIG. 3 a top view of a non-return valve.
Figure 4:
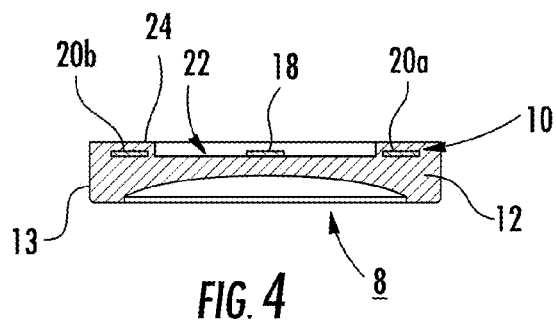
FIG. 4 a section through the plane I according to FIG. 3.
Figure 5:
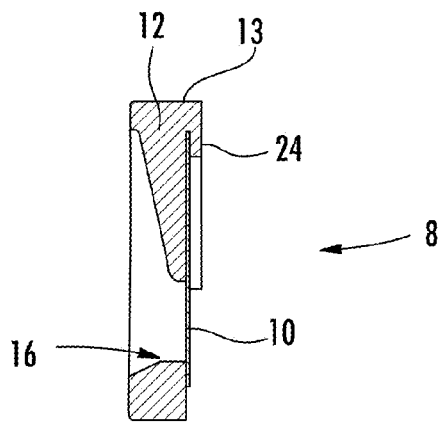
FIG. 5 a section through the plane II according to FIG. 3.

The detailed construction of the axially flat non-return valve 8 can be seen from FIGS. 2 to 5. In this embodiment, the non-return valve 8 is formed of a closing element 10 and a seal seat 12 and a filter 30 that are shown as separate components in the exploded view in FIG. 2. In the assembled form of the non-return valve 8, however, these are connected to each other rigidly and, in particular, in a non-detachable way and thus form a prefabricated assembly or structural unit 13 that is shown in FIGS. 3 to 5.

In this embodiment, the closing element 10 is made from spring steel, although the use of other spring materials is also possible. The closing element 10 comprises three functional areas: a closing plate 14 for the closing of an opening 16 in the seal seat 12, a spring-like bending web 18, and a fixing end 20 that is assembled in this embodiment from two fixing arms 20a, 20b. The shape of the fixing arms 20a, 20b follows the contours of the valve seat 12, so that the fixing end 20 has an arc-like shape in the shown embodiment. In one top view, the closing element 10 thus has approximately the shape of an armature.

The seal seat 12 is made from plastic and has a contact surface 22 on which the closing element 10 lies in a closed position of the non-return valve 8 and in this way covers the opening 16. The shape of the closing plate 14 is here adapted to the shape of the opening 16. The seal seat 12 has a somewhat disk-shaped form and has a thickness of a few centimeters depending on the requirements and/or use case. The diameter of the seal seat 12 corresponds essentially to an inner diameter of the valve housing 4. The seal seat 12 is an injection molded part during whose production the fixing arms 20a, 20b are injection molded with the material of the seal seat 12, so that the fixing arms 20a, 20b are completely surrounded by an axial collar 24 that extends with an arc-like shape in the edge area of the contact surface 22. A filter 30 for filtering the pressurized medium is arranged on the side of the seal seat 12 opposite the closing plate 14.

A pressurized medium, for example, oil, which is introduced into the control valve 2 through the work connection P, is led into the pressurized medium line 7 and passes through the non-return valve 8 in that the closing plate 14 rises due to the pressing force of the pressurized medium, so that the opening 16 is opened and the pressurized medium can flow in the direction of the work connections A, B. An opening of the non-return valve 8 is possible thanks to the elastic spring properties of the bending web 18 combined with the stationary mounting of the fixing arms 20a, 20b on the seal seat 12. The spring force to be overcome depends on the material and strength of the closing element 10.

If there is a pressure shock against the direction of flow or if there is a return flow of the pressurized medium, the closing plate 14 of the non-return valve 8 is pressed against the contact surface 22, so that the opening 16 is closed and a further return flow of the pressurized medium through the opening 16 is prevented.

The non-return valve 8 is characterized by its simple installation at its position of use, because its two components, the closing element 10 and the seal seat 12, form one structural unit 13 due to the injection molding of the fixing arms 20a, 20b and this structural unit is integrated as such in the control valve 2. Thus a complicated installation of the thin closing element 10 in the control valve 2 is eliminated.

LIST OF REFERENCE NUMBERS

2 Control valve
4 Valve housing
6 Control piston
7 Pressurized medium line
8 Non-return valve
10 Closing element
12 Seal seat
13 Structural unit
14 Closing plate
16 Opening
18 Bending web/bar
20 Fixing end
20a, b Fixing arms
22 Contact surface
24 Collar
30 Filter
A, B Work connections
P Feed connection
T Discharge connection

The invention claimed is:

1. A non-return valve comprising a seal seat with an opening and a flat closing element that includes a single cantilevered bending web having a closing plate on a first end for the opening, and a second, fixing end directly engaged by an axial collar including a radially inwardly extending flange molded on the seal seat, the closing element covers the opening in a closed position, the closing element and the seal seat are connected rigidly to each other and form a prefabricated structural unit.

2. The non-return valve according to claim 1, wherein the fixing end comprises at least one fixing-arm.

3. The non-return valve according to claim 1, wherein the closing element is made from spring steel.

4. The non-return valve according to claim 1, wherein the seal seat is an injection molded part.

5. The non-return valve according to claim 1, wherein the fixing end of the closing element is injection molded with material of the seal seat.

6. A hydraulic valve for controlling flows of pressurized medium in a camshaft adjuster, comprising a hollow valve housing with at least one feed connection (P) and at least one discharge connection (T), and a non-return valve according to claim 1, is located in the valve housing.

7. A non-return valve according to claim 1, wherein a pressurized medium filter is integrated in the seal seat.

8. The non-return valve according to claim 1, wherein the second, fixing end is radially inserted into a slot defined in the axial collar of the seal seat.

* * * * *